US012266873B2

(12) United States Patent
Wang et al.

(10) Patent No.: US 12,266,873 B2
(45) Date of Patent: Apr. 1, 2025

(54) QUICK-LOCKING PISTON-TYPE FLOATING POWER SUPPLY CONNECTOR

(71) Applicants: GUIZHOU SPACE APPLIANCE CO., LTD, Guizhou (CN); SHANGHAI•AEROSPACE•SCIENCE & INDUSTRY•APPLIANCE•CO., LTD, Shanghai (CN); SUZHOU HUAZHAN SPACE APPLIANCE CO., LTD, Suzhou (CN)

(72) Inventors: Hongji Wang, Shanghai (CN); Xu Wang, Shanghai (CN); Zuotao Zou, Shanghai (CN); Qifeng Xu, Shanghai (CN); Liangtao Zhu, Shanghai (CN)

(73) Assignees: GUIZHOU SPACE APPLIANCE CO., LTD, Guizhou (CN); SHANGHAI•AEROSPACE•SCIENCE & INDUSTRY•APPLIANCE•CO. LTD, Shanghai (CN); SUZHOU HUAZHAN SPACE APPLIANCE CO., Jiangsu (CN)

( * ) Notice: Subject to any disclaimer, the term of this patent is extended or adjusted under 35 U.S.C. 154(b) by 513 days.

(21) Appl. No.: 17/761,104

(22) PCT Filed: Aug. 21, 2020

(86) PCT No.: PCT/CN2020/110539

§ 371 (c)(1),
(2) Date: Mar. 16, 2022

(87) PCT Pub. No.: WO2021/052108

PCT Pub. Date: Mar. 25, 2021

(65) Prior Publication Data

US 2022/0376411 A1 Nov. 24, 2022

(30) Foreign Application Priority Data

Sep. 19, 2019 (CN) ......................... 201910884573.8
Jul. 7, 2020 (CN) ......................... 202010647897.2

(51) Int. Cl.
*H01R 13/62* (2006.01)
*H01R 4/30* (2006.01)
(Continued)

(52) U.S. Cl.
CPC ............. *H01R 12/55* (2013.01); *H01R 4/308* (2013.01); *H01R 4/48* (2013.01); *H01R 13/434* (2013.01); *H01R 13/506* (2013.01)

(58) Field of Classification Search
CPC ...................................................... H01R 12/55
See application file for complete search history.

(56) References Cited

U.S. PATENT DOCUMENTS 4,185,881 A * 1/1980 Foley ................ H01R 13/4532 439/337
4,421,371 A * 12/1983 Clark .................. H01R 13/631 439/249
(Continued)

FOREIGN PATENT DOCUMENTS

CN 102290660 A 12/2011
CN 207021403 U 1/2012
(Continued)

OTHER PUBLICATIONS

Japanese Office Action dated Mar. 28, 2023 issued in corresponding Patent Application No. 2022-517845 (4 pages).
(Continued)

*Primary Examiner* — James Harvey
(74) *Attorney, Agent, or Firm* — GREENBLUM & BERNSTEIN, P.L.C.

(57) ABSTRACT

A quick-locking piston-type floating power supply connector includes a housing assembly, a contact assembly, and a
(Continued)

base assembly, wherein the housing assembly is sleeved on an outer wall of one end of the base assembly, one end of the contact assembly is fixed in the base assembly, the other end of the contact assembly extends from the base assembly, the other end of the contact assembly extends outwards to be partially embedded into a cover plate assembly, a floating contact member of a piston-type structure is vertically arranged at the terminal of the other end of the contact assembly, the floating contact member is mounted in the cover plate assembly, a mounting opening of the floating contact member extends outwards to the cover plate assembly, and the floating contact member is used for meeting the electrical assembly requirements of PCBs with different heights.

7 Claims, 8 Drawing Sheets

(51) Int. Cl.

| | |
|---|---|
| ***H01R 4/48*** | (2006.01) |
| ***H01R 12/55*** | (2011.01) |
| ***H01R 13/434*** | (2006.01) |
| ***H01R 13/506*** | (2006.01) |

(56) References Cited

U.S. PATENT DOCUMENTS

| | | | | |
|---|---|---|---|---|
| 2004/0014358 | A1* | 1/2004 | Leve | H01R 24/545 439/581 |
| 2005/0118861 | A1 | 6/2005 | Chung | |
| 2012/0220141 | A1* | 8/2012 | Ickler | H01R 24/40 439/11 |
| 2014/0170886 | A1* | 6/2014 | Kikuchi | H01R 13/424 439/345 |
| 2016/0240973 | A1 | 8/2016 | Zieman | |
| 2018/0083378 | A1* | 3/2018 | Plested | H01R 13/40 |
| 2021/0203112 | A1* | 7/2021 | McRae | H01R 13/04 |

FOREIGN PATENT DOCUMENTS

| | | | | |
|---|---|---|---|---|
| CN | 103050838 | A | 4/2013 | |
| CN | 103872484 | A | 6/2014 | |
| CN | 103904482 | A | 7/2014 | |
| CN | 102324655 | A | 2/2018 | |
| CN | 107819223 | A | 3/2018 | |
| CN | 109755781 | A | 5/2019 | |
| CN | 109888542 | A | 6/2019 | |
| CN | 110581391 | A | 12/2019 | |
| CN | 112151992 | A * | 12/2020 | H01R 13/04 |
| EP | 2463965 | A1 | 6/2012 | |
| JP | 2010-170710 | A | 8/2010 | |
| JP | 2014-120377 | A | 6/2014 | |
| JP | 2014-225396 | A | 12/2014 | |
| JP | 2016-024862 | A | 2/2016 | |

OTHER PUBLICATIONS

Translation of Japanese Office Action dated Mar. 28, 2023 issued in corresponding Patent Application No. 2022-517845 (4 pages).
International Search Report dated Nov. 27, 2020 issued in corresponding parent Application No. PCT/CN2020/110539, w/English Abstract (7 pages).
Written Opinion dated Nov. 27, 2020 issued in corresponding parent Application No. PCT/CN2020/110539, w/English Abstract (8 pages).
Chinese Office Action dated Feb. 9, 2021 issued in corresponding Patent Application No. 202010647897.2 (7 pages).
European Extended Search Report for corresponding EP Application No. 20865994.6 on Aug. 7, 2023 (8 pages).

* cited by examiner

QUICK-LOCKING PISTON-TYPE FLOATING POWER SUPPLY CONNECTOR

CROSS-REFERENCE TO THE RELATED APPLICATIONS

This application is a National Phase of International Application No. PCT/CN2020/110539, filed on Aug. 21, 2022, which claims priority to Chinese Patent Application Nos. 202010647897.2, filed on Jul. 7, 2020 and 201910884573.8, filed Sep. 19, 2019, the contents of which are expressly incorporated by reference herein in their entireties.

TECHNICAL FIELD

The present disclosure belongs to the technical field of electrical connectors, and particularly relates to a quick-locking piston-type floating power connector.

BACKGROUND

Power connectors are widely used in communication equipment, household appliances, industrial equipment, aerospace and military fields, especially the signal transmission module of base stations in the communication field. With the rapid development of industrial electronic technology, intelligent automobile and communication market, the market demand for power connectors is also increasing. In addition, the rapid development of science and technology level and the rapid penetration of electronic products into various fields have prompted power connectors to develop in a direction of miniaturization, convenience, low cost, high reliability, strong versatility and simple structure.

The power connector in the prior art has the problems of complex structure, complicated mounting, large space occupation and high production cost. In order to avoid complex jumpers, the existing jumper-free power connectors are mostly complex structures with three parts: a socket, an adapter and a PCB board connector. the entire inner PCB board of the RU unit requirements to be removed during assembling and disassembling, which is a cumbersome process and has many failure steps. In addition, due to the high requirements for jumper-free power connectors due to the floating and tolerance of the PCB board position, most of these power connectors can only be applied to PCB board with a fixed height position, resulting in poor versatility and great limitation on application occasions of the connector.

SUMMARY

Aiming at the deficiencies in the prior art, the present disclosure provides a quick-locking piston-type floating power connector, and the specific technical scheme is as follows:

A quick-locking piston-type floating power connector includes a housing assembly, a contact assembly and a base assembly. The housing assembly is sleeved on an outer wall of one end of the base assembly. One end of the contact assembly is fixed in the base assembly, and the other end of the contact assembly protrudes from the base assembly. A protruding portion of the other end of the contact assembly is embedded in a cover plate assembly. An end portion of the other end of the contact assembly is vertically provided with a floating contact member of a piston-type structure. The floating contact assembly is mounted in the cover plate assembly, and a mounting port of the floating contact assembly protrudes from the cover plate assembly. The floating contact member is adapted to meet the electrical assembly requirements of PCB boards of different heights.

Further, the floating contact member includes a sleeve, a crown spring and a guide pin. A bottom of the guide pin is embedded in an end portion of the contact assembly, the guide pin extends into an inner bottom portion of the sleeve, an inner top portion of the sleeve is provided with an inner thread structure, an outer wall of the guide pin is sleeved with the crown spring, the crown spring is disposed between the sleeve and the guide pin, and the crown spring, the guide pin and the sleeve are in electrical contact via elastic crimping.

Further, the guide pin includes a cylinder and a positioning seat. An outer wall of the positioning seat is of a sawtooth structure, the positioning seat is assembled in the contact assembly in an interference fit, the cylinder is concentrically provided on a top surface of the positioning seat, an outer wall of the cylinder is vertically and symmetrically provided with a limiting block, the sleeve has a shape of a hollow cylinder, the cylinder is mounted in an inner bottom portion of the sleeve, a bottom portion of the sleeve is symmetrically provided with a limiting groove, the limiting block extends into the limiting groove, and the limiting block is configured to prevent the sleeve from rotating horizontally. An inner wall of the cover plate assembly is provided with a matching groove, the matching groove is a circular groove, and the sleeve is embedded in the matching groove.

Further, a tapered protrusion protrudes from an inner wall of the limiting groove, the tapered protrusion blocks at a bottom portion of the limiting block, and the tapered protrusion is configured to prevent the sleeve from separating in a vertical direction.

Further, the guide pin includes a cylinder and a positioning seat. An outer wall of the positioning seat is of a sawtooth structure, the positioning seat is assembled in the contact assembly in an interference fit, the cylinder is concentrically provided on a top surface of the positioning seat, the sleeve includes an upper barrel and a lower barrel, the upper barrel has a ring structure, the lower barrel has a structure of an outer square and an inner circle, the upper barrel is provided on a top portion of the lower barrel, the cylinder extends into the lower barrel, an inner wall of the cover plate assembly is provided with a matching groove, a top portion of the matching groove is a circular groove, a bottom portion thereof is a rectangular groove, the upper barrel is embedded in the circular groove, a rectangular surface of an outer wall of the lower barrel is attached to and embedded in the rectangular groove, and the rectangular groove is configured to prevent the sleeve from rotating horizontally.

Further, an inner wall of the circular groove is provided with a concave floating sliding groove, a top portion of an outer wall of the upper barrel is provided with an upper baffle ring, a middle portion of the outer wall of the upper barrel is provided with a floating ring, the floating ring is slidably embedded in the floating sliding groove, the upper baffle ring is provided on a top portion of the cover plate assembly, and the floating ring and the upper baffle ring are configured to prevent the sleeve from separating in a vertical direction.

Further, the contact assembly includes a positioning conductor and an external conductor. The positioning conductor is embedded in the base assembly, the external conductor protrudes from the base assembly, the external conductor is embedded in the cover plate assembly, an outer wall of the positioning conductor is provided with a annular groove, an outer portion of the annular groove is sleeved with an elastic locking ring, an outer wall of the positioning conductor is provided with a barb, both sides of an end portion of the positioning conductor have flat surfaces, the locking ring, the barb, and the flat surfaces are all matched with an inner wall of the base assembly, the external conductor includes a bending section and an external plate, the bending section is of a slope structure inclined downward, one end of the bending section is connected to the positioning conductor, the other end of the bending section is connected to the external plate, and a surface of the external plate is vertically provided with the floating contact member.

Further, an inner wall of the cover plate assembly is provided with a groove matching with the external conductor, the inner wall of the groove is provided with a protruding rib, and the rib is configured to fill a gap between the external conductor and the groove.

The beneficial effects of the present disclosure are:

1. The power connector with integrated structure is formed by matching and assembling between the housing assembly, the contact assembly, the base assembly, the cover plate assembly and the floating contact member, which eliminates the complicated assembly process of the conventional connector and is integrated directly, which is easy to insert and disassemble, such that the mounting and the maintenance of the connector is greatly simplified.

2. The floating contact member can adjust a height of the mounting port according to a position of the PCB board, which greatly increases the versatility and reliability of the connector, and achieves the reliable power supply of the connector to the PCB board subsystem under different mounting positions of the PCB board.

3. The floating contact member is provided with various blocking and limiting structures therein, which effectively improves the structural strength of the sleeve and ensures the stability of the contact.

DETAILED DESCRIPTION OF THE EMBODIMENTS

In order to make the objectives, technical solutions and advantages of the present disclosure more clear, the present disclosure will be further described in detail below with reference to the embodiments. It should be understood that the specific embodiments described herein are only used to explain the present disclosure, but not to limit the present disclosure.

Figure 1:
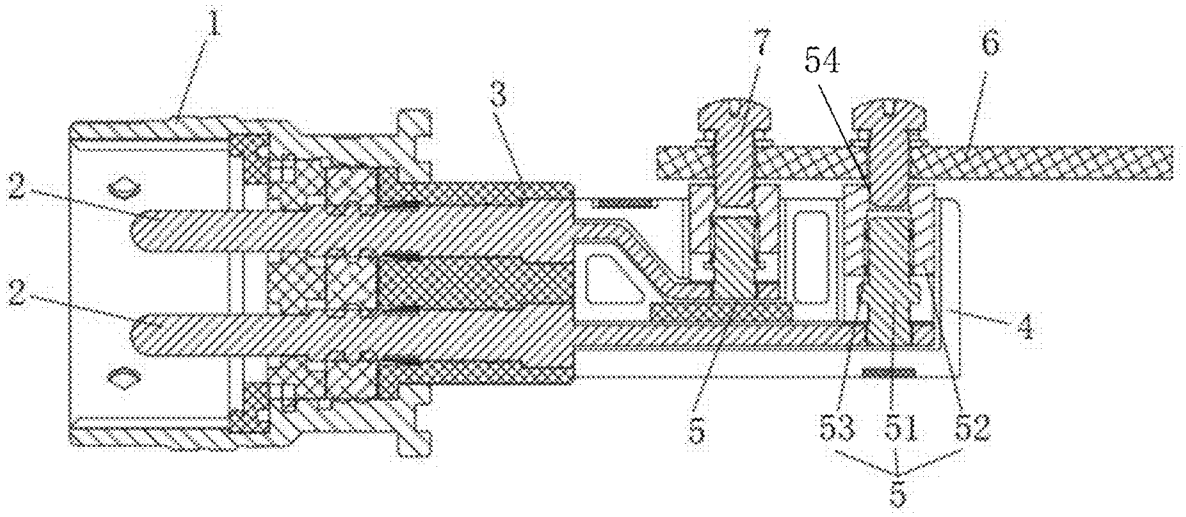
FIG. 1 shows a schematic view of a first embodiment of the quick-locking piston-type floating power connector of the present disclosure.
Figure 2:
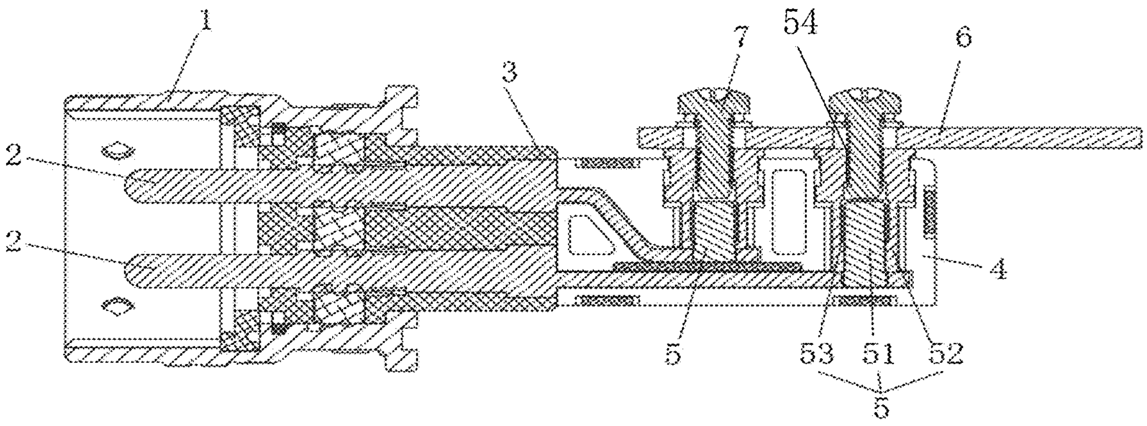
FIG. 2 shows a schematic view of a second embodiment of the quick-locking piston-type floating power connector of the present disclosure.

As shown in FIG. 1 or FIG. 2, a quick-locking piston-type floating power connector includes a housing assembly 1, a contact assembly 2, and a base assembly 3. The housing assembly 1 is sleeved on an outer wall of one end of the base assembly. One end of the contact assembly 2 is fixed in the base assembly 3, the other end of the contact assembly 2 protrudes from the base assembly 3. A protruding portion of the other end of the contact assembly 2 is embedded in the cover plate assembly 4. An end portion of the other end of the contact assembly is vertically provided with a floating contact member 5 of a piston-type structure. The floating contact member 5 is mounted in the cover plate assembly 4, a mounting port 54 of the floating contact member 5 protrudes from the cover plate assembly 4, and the floating contact member 5 is adapted for electrical assembly requirements of PCB boards of different heights. The power connector with an integrated structure is form by matching and assembling of the housing assembly 1, the contact assembly 2, the base assembly 3, the cover plate assembly 4, and the floating contact member 5, which eliminates the complicated assembly process of the conventional connector and is directly made into an integrated structure, which is easy to insert and disassemble, and greatly simplifies the mounting and maintenance of the connector. Meanwhile, the floating contact member 5 can adjust a height of the mounting port 54 according to a position of the PCB board, which greatly increases the versatility and reliability of the connector.

Figure 3:
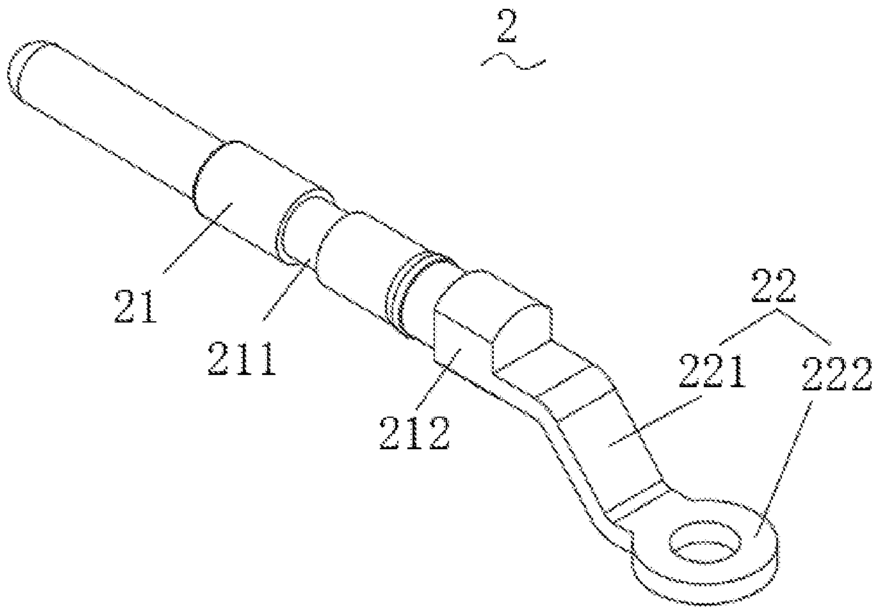
FIG. 3 shows a schematic view of a contact assembly of the present disclosure.
Figure 4:
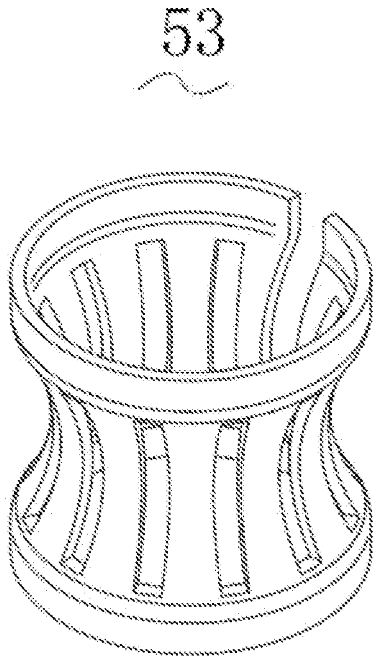
FIG. 4 shows a schematic view of a crown spring of the present disclosure.
Figure 5:
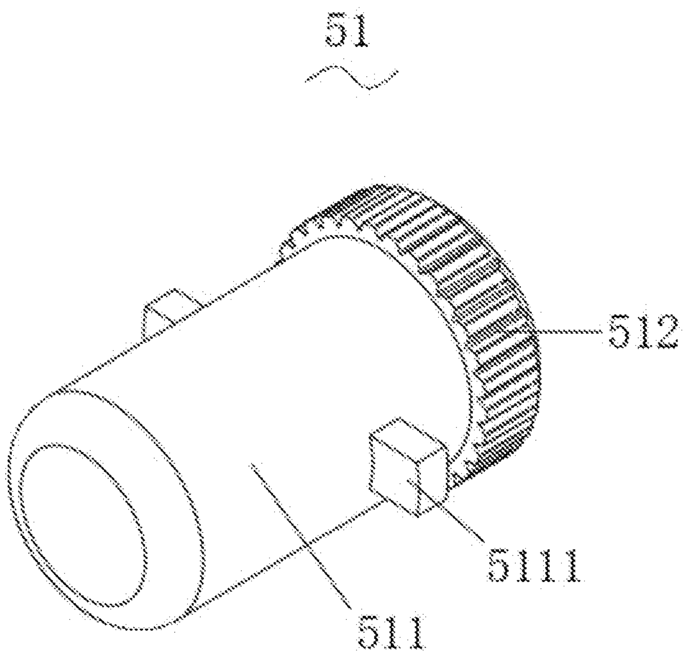
FIG. 5 shows a schematic view of a guide member of the first embodiment.
Figure 6:
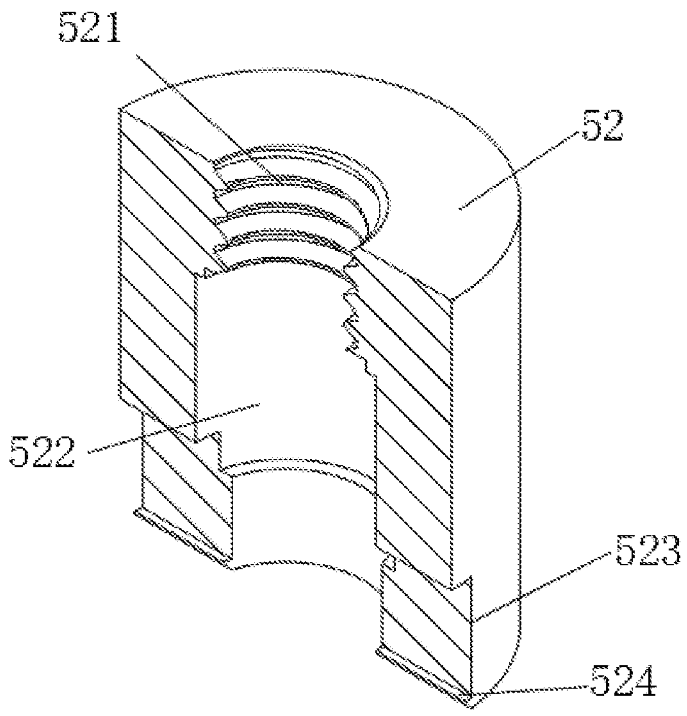
FIG. 6 shows a schematic view of a sleeve structure of the first embodiment.
Figure 7:
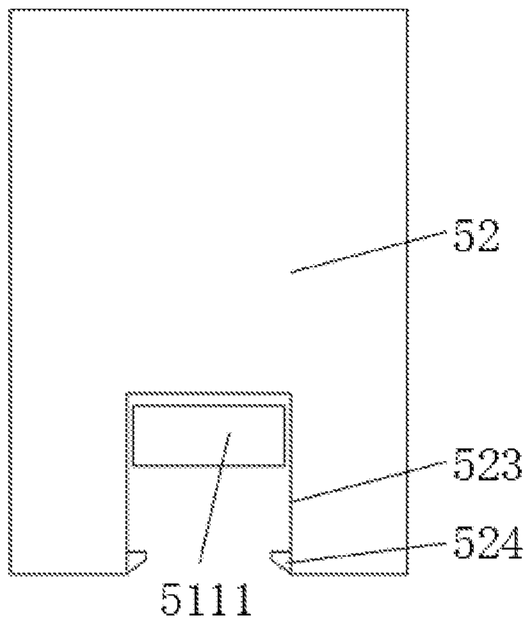
FIG. 7 shows a schematic view of a matching structure of the sleeve and a limiting block according to the first embodiment.
Figure 8:
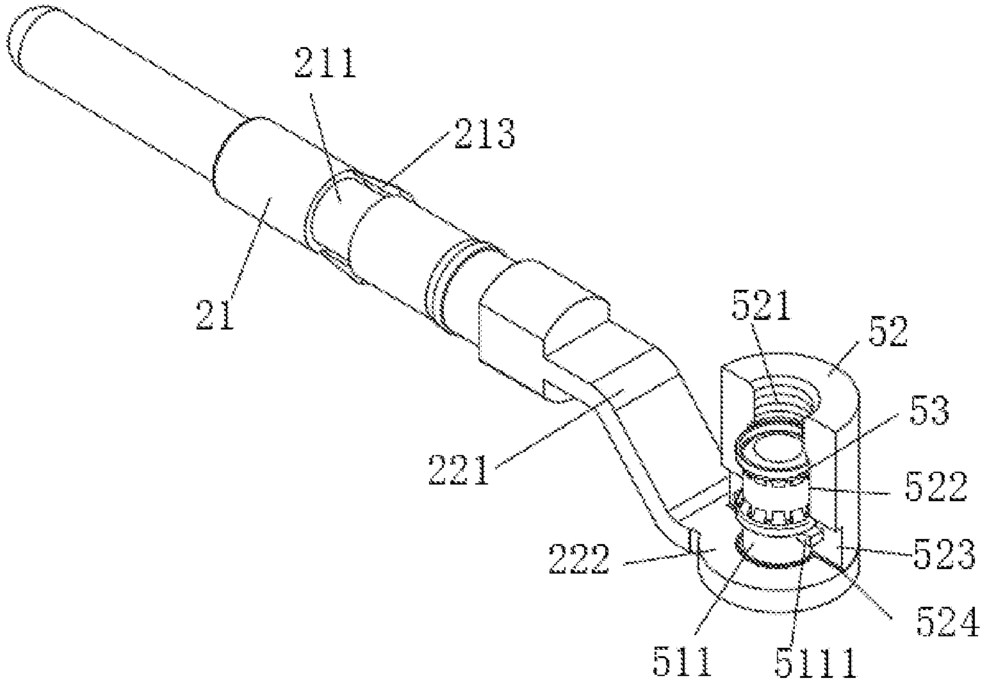
FIG. 8 shows a schematic view of a connection structure between the contact assembly and the floating contact member according to the first embodiment.
Figure 9:
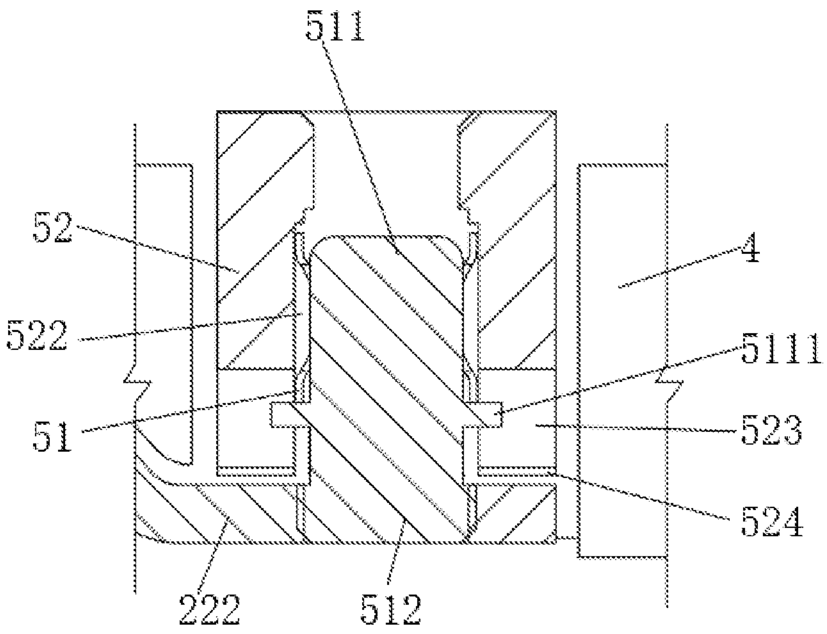
FIG. 9 shows a schematic view of the overall cross-sectional structure of the contact assembly according to the first embodiment.
Figure 10:
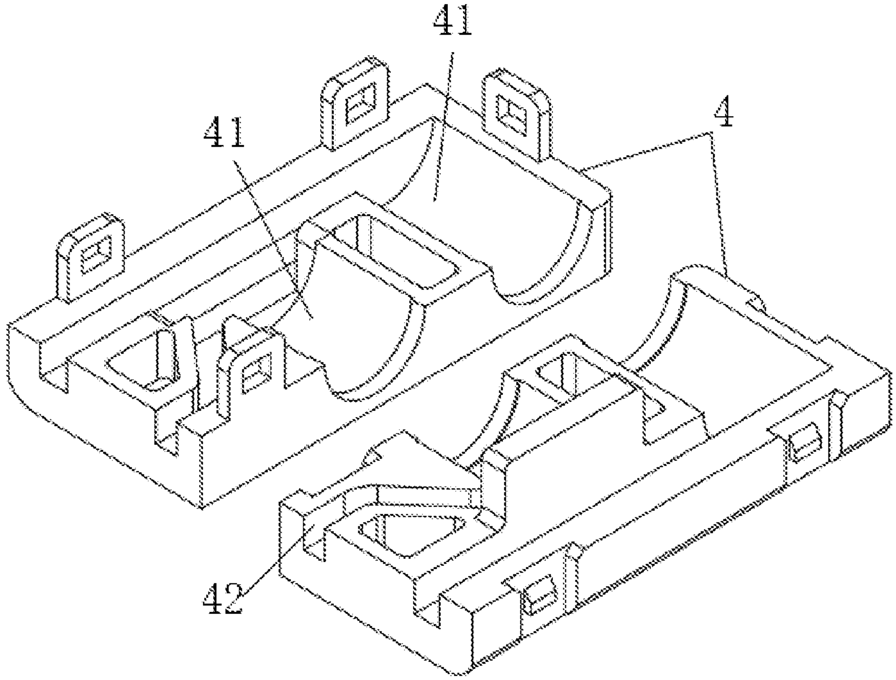
FIG. 10 shows a schematic view of a cover plate assembly of the first embodiment.
Figure 11:
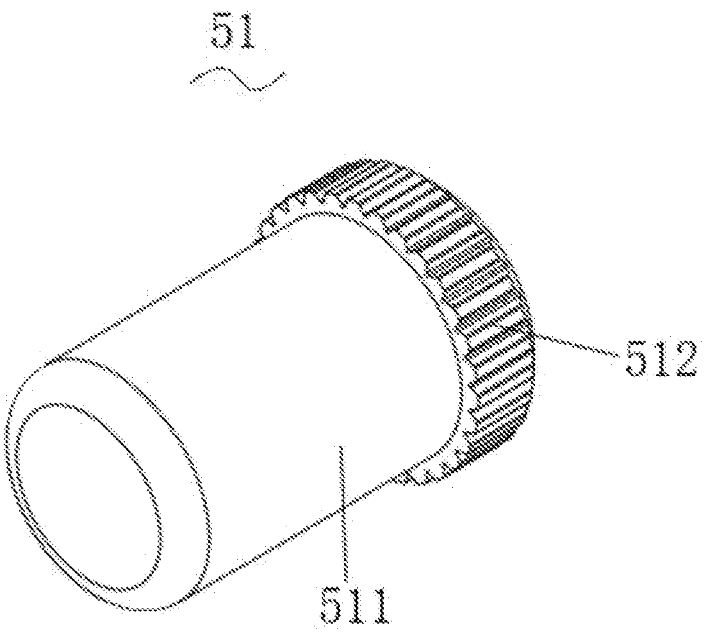
FIG. 11 shows a schematic view of a guide member of the second embodiment.
Figure 12:
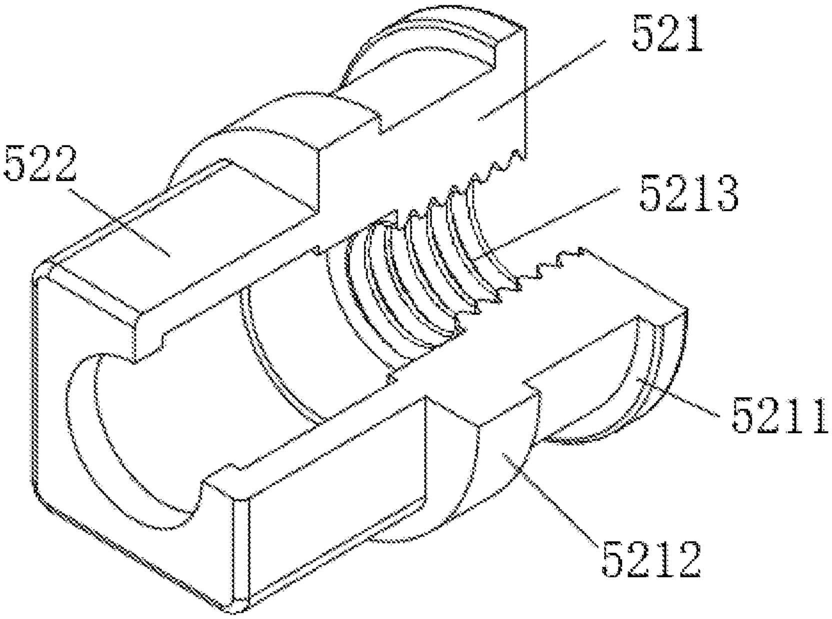
FIG. 12 shows a schematic view of the sleeve of the second embodiment.
Figure 13:
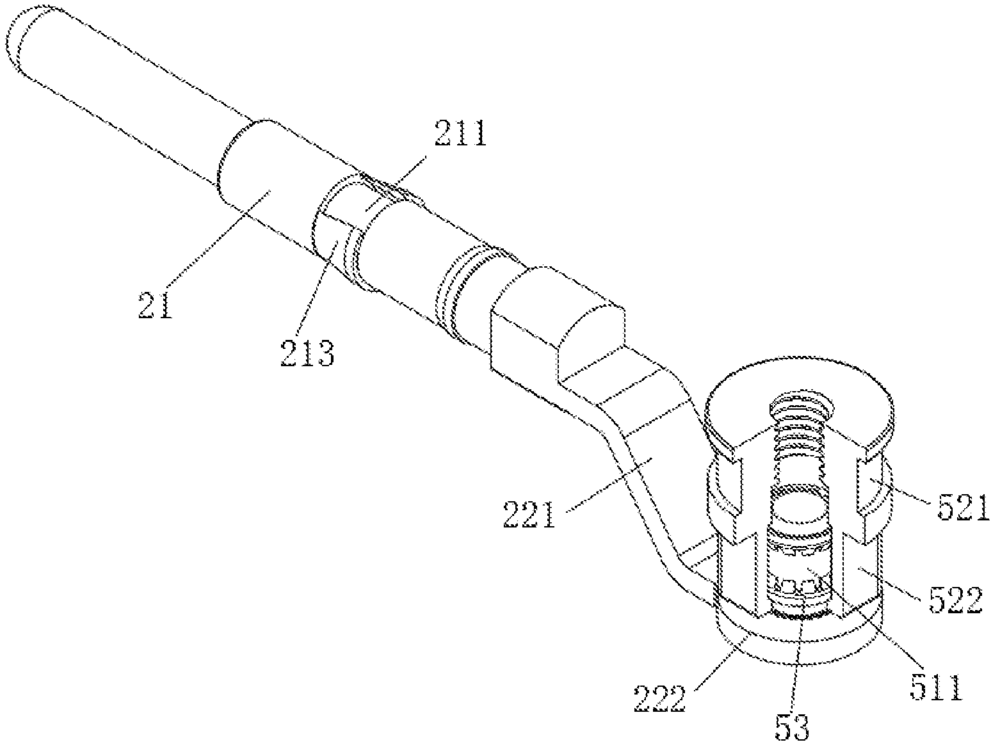
FIG. 13 shows a schematic view of the connection structure between the contact assembly and the floating contact member according to the second embodiment.
Figure 14:
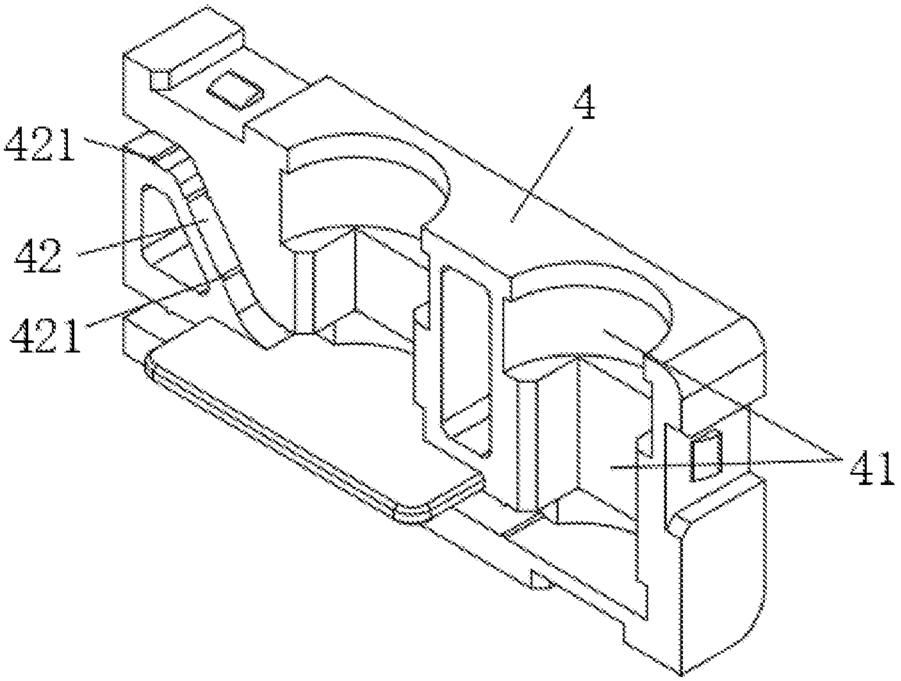
FIG. 14 shows a schematic view of the cover plate of the second embodiment.
Figure 15:
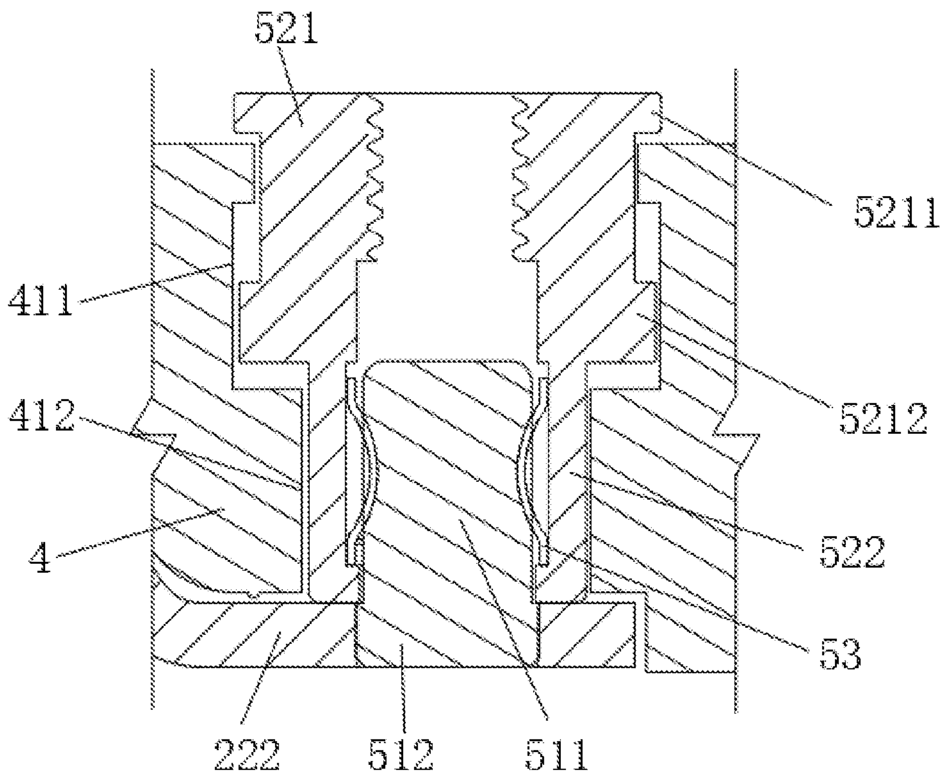
FIG. 15 shows a schematic view of the overall cross-sectional structure of the floating contact member according to the second embodiment.

As shown in FIG. 3, the contact assembly 2 includes a positioning conductor 21 and an external conductor 22. The positioning conductor 21 is embedded in the base assembly 3. The external conductor 22 protrudes from the base assembly 3 and is embedded in the cover plate assembly 4. An outer wall of the positioning conductor 21 is provided with an annular groove 211, and an elastic locking ring 213 is sleeved on the outside of the annular groove 211. An outer wall of the positioning conductor 21 is provided with a barb, and both sides of an end portion of the positioning conductor 21 are flat surfaces 212. The locking ring 213, the barb and the flat surface 212 are all matched with an inner wall of the base assembly 3. The external conductor 22 includes a bending section 221 and an external plate 222. The bending section 221 is of a slope structure inclined downward. One end of the bending section 221 is connected to the positioning conductor 21, and the other end thereof is connected to the external plate 222. A surface of the outer plate 222 is vertically provided with the floating contact member 5. The bending section 221 is capable of fully reducing a height position of the external plate 222, thereby greatly reducing an overall size of the connector. The flat surface 212 prevents the contact assembly from deflecting in the base assembly 3, and has a positioning effect. The locking ring and the barb can improve the positioning strength of the contact assembly.

As an improvement of the aforementioned technical solution, an inner wall of the cover plate assembly 4 is provided with a groove 42 matching with the external conductor 22, and an inner wall of the groove 42 is provided with a protruding rib 421. The rib 421 is configured to fill a gap between the external conductor 22 and the groove 42. The rib 421 can reduce a gap between the cover plate and the external conductor 22, thus improving the matching strength of the two, and prevent the cover plate assembly from shaking after assembly.

As an improvement of the aforementioned technical solution, the floating contact member 5 includes a sleeve 52, a crown spring 53 and a guide pin 51. A bottom of the guide pin 51 is embedded in an end portion of the contact member 5, and the guide pin 51 extends into an inner bottom portion of the sleeve 52. An inner top portion of the sleeve 52 is provided with an inner thread structure, and an outer wall of the guide pin 51 is sleeved with the crown spring 53. The crown spring 53 is arranged between the sleeve 52 and the guide pin 51. The crown spring 53, the guide pin 51 and the sleeve 52 are in electrical contact via elastic crimping. On the one hand, the crown spring 53 with an electrical structure achieves electrical contact between the guide pin 51 and the sleeve 52. On the other hand, the crown spring 53 with an electrical structure is capable of improving the matching strength between the guide pin 51 and the sleeve 52, such that the three are connected more closely, and the structural strength and the electrical transmission can be guaranteed during the floating process. The guide pin 51 is configured to be connected to the contact assembly 5, and serves as a guide and support component for the floating of the sleeve 52 at the same time. The sleeve 52 is configured to be connected to the external PCB board via screws, and can slide up and down to adjust a position of the mounting port 54.

The housing assembly 1 is also provided with a push-pull quick-locking ceramic bead structure and an interface-sealed O-ring. Both ends of the guide pin 51 have arc-shaped transition structures to reduce the resistance during assembly. The cover plate assembly 4 includes two cover plates buckled together.

Two embodiments of the aforementioned floating contact member 5 are exemplarily described below. Of course, the implementation of the floating contact member 5 is not limited to the following two embodiments.

The First Embodiment

As shown in FIG. 5 to FIG. 10, the guide pin 51 includes a cylinder 511 and a positioning seat 512. An outer wall of the positioning seat 512 is of a sawtooth structure, and the positioning seat 512 is assembled in the contact assembly 2 in an interference fit. The cylinder 511 is concentrically provided on a top surface of the positioning seat 512, and an outer wall of the cylinder 511 is vertically and symmetrically provided with a limiting block 5111. The sleeve 52 has a shape of a hollow cylinder, and the cylinder 511 is mounted in an inner bottom portion of the sleeve 52. A bottom portion of the sleeve 52 is symmetrically provided with a limiting groove 523, the limiting block 5111 extends into the limiting groove 523, and the limiting block 5111 is configured to prevent the sleeve 52 from rotating horizontally. The interference assembled positioning seat 512 can improve the connection strength of the guide member 51 and the contact assembly 2. The limiting block 5111 is capable of reversely blocking the sleeve 52, such that the sleeve cannot rotate, meanwhile the limiting block 5111 can slide up and down in the limiting groove 523 to ensure that the sleeve can float up and down.

The inner wall of the cover plate assembly 4 is provided with a matching groove 41, the matching groove 41 is a circular groove, and the sleeve 52 is embedded in the matching groove 41. The matching groove 41 is configured to restrain the positioning sleeve 52 from the outside, and prevents the sleeve from deflecting, such that the sleeve can only move up and down.

A tapered protrusion 524 protrudes from an inner wall of the limiting groove 523, the tapered protrusion 524 blocks at a bottom portion of the limiting block 5111, and the tapered protrusion 524 is configured to prevent the sleeve from separating in a vertical direction. When the sleeve moves upward and is about to exceed the warning value, the limiting block 5111 will abut the tapered protrusion 524, such that the sleeve cannot continue to move upward, so as to achieve blocking in the vertical direction and prevent the sleeve from separating, while constraining a movement range of the sleeve.

An internal threaded hole 521, a mounting hole 522, a limiting groove 523 and a tapered protrusion 524 are provided in sequence from top to bottom inside the sleeve 52. The inner threaded hole 521 is configured to be connected to the screw, the mounting hole 522 is a mounting position of the crown spring and the guide pin, the limiting groove 523 and the mounting hole 522 are distributed in a cross, and the bottom portion of the limiting groove 523 is provided with a tapered protrusion 524.

An internal threaded hole 521, a mounting hole 522, a limiting groove 523 and a conical protrusion 524 are provided in sequence from top to bottom inside the sleeve 52. The inner threaded hole 521 is configured to be connected to the screw, the mounting hole 522 is a mounting position of the crown spring and the guide pin, the limiting groove 523 and the mounting hole 522 are distributed in a cross, and the bottom portion of the limiting groove 523 is provided with a conical protrusion 524.

When the first embodiment is implemented specifically: the positioning conductor 21 of the contact assembly 2 is latched and embedded into the base assembly 3, the locking ring 213, the barb and the flat surface 213 are all matched with the inner wall of the base assembly, and the external conductor 22 protrudes from the base assembly 3. Then the housing assembly 1 is rotatably mounted on a tail end of the base assembly, and the positioning seat 512 at the bottom of the floating contact member 5 is crimped in a circular hole of the external plate 222 in an interference fit. After the floating contact member 5 and the contact assembly 2 are assembled, the cover plate assembly 4 is latched to the outside of the external conductor, and the cover plate assembly 4 performs positioning protection for the external conductor and the floating contact member.

When the PCB board 6 is connected, a protruding height of the sleeve 52 is adjusted according to a position of the PCB board 6. When adjusting, the sleeve 52 is pulled upward, and the sleeve 52 slides along the matching groove 41 on the inner wall of the cover plate assembly 4. The limiting block 5111 slides relatively downward in the limiting groove 523, the sleeve 52 will also follow and move upward with the crown spring 53, and the crown spring 53 is kept in a contracted state clamped by the guide pin and the sleeve. After adjusting to a required position, the PCB board is disposed on a top surface of the sleeve, such that a reserved hole of the PCB board screw aligns at a top of the sleeve, and then the screw 7 is screwed through the reserved hole and into the sleeve. During the screwing process, the limiting block 5111 will reversely block the sleeve to prevent the sleeve from rotating. After the screw is completely screwed, the electrical connection between the floating contact member 5 and the PCB board can be achieved.

The Second Embodiment

The guide pin 51 includes a cylinder 511 and a positioning seat 512. An outer wall of the positioning seat 512 is of a sawtooth structure. The positioning seat 512 is assembled in the contact assembly 2 in an interference fit. The cylinder 511 is concentrically provided on the top surface of the positioning seat 512. The sleeve 52 includes an upper barrel 521 and a lower barrel 522. The upper barrel has a ring structure, the lower barrel has a structure of an outer square and an inner circle. The upper barrel 521 is disposed on a top portion of the lower barrel 522, and the cylinder 511 extends into the lower barrel 522. The interference assembled positioning seat 512 can improve the connection strength between the guide member 51 and the contact assembly 2.

The inner wall of the cover plate assembly 4 is provided with a matching groove, the top portion of the matching groove is a circular groove, and the bottom portion thereof is a rectangular groove. The upper barrel 521 is embedded in the circular groove, and the lower barrel 522 is embedded in the rectangular groove. The rectangular groove is configured to prevent the sleeve from rotating horizontally. The lower barrel 522 with a rectangular surface can match with the rectangular groove, thereby reversely counteracting a torsion force caused by the screw to the sleeve, thereby preventing the sleeve from rotating. The design is simple in structure, can be processed by conventional processing equipment, and has a low cost and a long service life.

An inner wall of the circular groove is provided with a concave floating sliding groove, a top portion of an outer wall of the upper barrel 521 is provided with an upper baffle ring 5211, and a middle portion of the outer wall of the upper barrel 521 is provided with a floating ring 5212. The floating ring 5212 is slidably embedded in the floating sliding groove, the upper baffle ring 5211 is disposed on a top portion of the cover plate assembly, and the floating ring 5212 and the upper baffle ring 5211 are configured to prevent the sleeve 52 from separating in the vertical direction. When the sleeve 52 moves, the floating ring 5212 will be driven by the sleeve 52 to slide along the floating sliding groove, and the floating sliding groove can constrain the floating stroke of the sleeve, while avoiding the sleeve from disengaging upwards.

An inner top of the upper barrel 521 is provided with an internal threaded hole 5213.

When the second embodiment is implemented specifically: the positioning conductor 21 of the contact assembly 2 is latched and embedded into the base assembly 3, the locking ring 213, the barb and the flat surface 213 are all matched with the inner wall of the base assembly, and the external conductor 22 protrudes from the base assembly 3. Then the housing assembly 1 is rotatably mounted on a tail end of the base assembly, and the positioning seat 512 at the bottom of the floating contact member 5 is crimped in a circular hole of the external plate 222 in an interference fit. After the floating contact member 5 and the contact assembly 2 are assembled, the cover plate assembly 4 is latched to the outside of the external conductor, and the cover plate assembly 4 performs positioning protection for the external conductor and the floating contact member.

When the PCB board 6 is connected, the protruding height of the sleeve 52 is adjusted according to the position of the PCB board 6. When adjusting, the sleeve 52 is pulled upward, the upper barrel 521 slides along the circular groove at the top portion of the matching groove 41, the floating ring 5121 slides in the floating sliding groove, the lower barrel 522 slides in the rectangular groove at the bottom portion of the matching groove 41, and the sleeve 52 also follows and moves upward with the crown spring 53. The crown spring 53 remains in a retracted state clamped by the guide pin and the sleeve. After adjusting to a desired position, the PCB board 6 is disposed on the top surface of the sleeve, such that the reserved hole of the PCB board 6 is aligned with the female screw hole 5213 at the top of the sleeve. Then the screw 7 is screwed through the reserved hole into the female screw hole 5213. During the screwing process, the rectangular surfaces between the lower barrel and the rectangular groove are matched to prevent the sleeve from following the rotating. When the screw is completely screwed, the electrical connection of the floating contact member 5 and the PCB board 6 can be achieved.

The foregoing is only a better example of the present disclosure and is not intended to limit the present disclosure, and any modifications, equivalent replacements and improvements made within the spirit and principles of the present disclosure shall be covered by the protection of the present disclosure.

What is claimed is:

1. A piston-type floating power connector, comprising a housing assembly, a contact assembly, and a base assembly, wherein the housing assembly is sleeved on an outer wall of one end of the base assembly, one end of the contact assembly is fixed in the base assembly, the other end of the contact assembly protrudes from the base assembly, a protruding portion of the other end of the contact assembly is embedded in a cover plate assembly, an end portion of the other end of the contact assembly is vertically provided with a floating contact member of a piston-type structure, the floating contact member is mounted in the cover plate assembly, a mounting port of the floating contact member protrudes from the cover plate assembly, and the floating contact member is adapted to meet the electrical assembly requirements of PCB boards of different heights; wherein the floating contact member comprises a sleeve, a crown spring, and a guide pin, a bottom of the guide pin is embedded in an end portion of the contact assembly, the guide pin extends into an inner bottom portion of the sleeve, an inner top portion of the sleeve is provided with an inner thread structure, an outer wall of the guide pin is sleeved with the crown spring, the crown spring is disposed between the sleeve and the guide pin, and the crown spring, the guide pin, and the sleeve are in electrical contact via elastic crimping.

2. The piston-type floating power connector according to claim 1, wherein the contact assembly comprises a positioning conductor and an external conductor, the positioning conductor is embedded in the base assembly, the external conductor protrudes from the base assembly, the external conductor is embedded in the cover plate assembly, an outer wall of the positioning conductor is provided with an annular groove, an outer portion of the annular groove is sleeved with an elastic locking ring, an outer wall of the positioning conductor is provided with a barb, both sides of an end portion of the positioning conductor have flat surfaces, the locking ring, the barb, and the flat surfaces are all matched with an inner wall of the base assembly, the external conductor comprises a bending section and an external plate, the bending section is of a slope structure inclined downward, one end of the bending section is connected to the positioning conductor, the other end of the bending section is connected to the external plate, and a surface of the external plate is vertically provided with the floating contact member.

3. The piston-type floating power connector according to claim 1, wherein the guide pin comprises a cylinder and a positioning seat, an outer wall of the positioning seat is of a sawtooth structure, the positioning seat is assembled in the contact assembly in an interference fit, the cylinder is concentrically provided on a top surface of the positioning seat, an outer wall of the cylinder is vertically and symmetrically provided with a limiting block, the sleeve has a shape of a hollow cylinder, the cylinder is mounted in an inner bottom portion of the sleeve, a bottom portion of the sleeve is symmetrically provided with a limiting groove, the limiting block extends into the limiting groove, and the limiting block is configured to prevent the sleeve from rotating horizontally; an inner wall of the cover plate assembly is provided with a matching groove, the matching groove is a circular groove, and the sleeve is embedded in the matching groove.

4. The piston-type floating power connector according to claim 3, wherein a tapered protrusion protrudes from an inner wall of the limiting groove, the tapered protrusion blocks at a bottom portion of the limiting block, and the tapered protrusion is configured to prevent the sleeve from separating in a vertical direction.

5. The piston-type floating power connector according to claim 1, wherein the guide pin comprises a cylinder and a positioning seat, an outer wall of the positioning seat is of a sawtooth structure, the positioning seat is assembled in the contact assembly in an interference fit, the cylinder is concentrically provided in a top surface of the positioning seat, the sleeve comprises an upper barrel and a lower barrel, the upper barrel has a ring structure, the lower barrel has a structure of an outer square and an inner circle, the upper barrel is provided on a top portion of the lower barrel, the cylinder extends into the lower barrel, an inner wall of the cover plate assembly is provided with a matching groove, a top portion of the matching groove is a circular groove, a bottom portion thereof is a rectangular groove, the upper barrel is embedded in the circular groove, a rectangular surface of an outer wall of the lower barrel is attached to and embedded in the rectangular groove, and the rectangular groove is configured to prevent the sleeve from rotating horizontally.

6. The piston-type floating power connector according to claim 5, wherein an inner wall of the circular groove is provided with a concave floating sliding groove, a top portion of an outer wall of the upper barrel is provided with an upper baffle ring, a middle portion of the outer wall of the upper barrel is provided with a floating ring, the floating ring is slidably embedded in the floating sliding groove, the upper baffle ring is provided on a top portion of the cover plate assembly, and the floating ring and the upper baffle ring are configured to prevent the sleeve from separating in a vertical direction.

7. The piston-type floating power connector according to claim 2, wherein an inner wall of the cover plate assembly is provided with a groove matching with the external conductor, an inner wall of the groove is provided with a protruding rib, and the rib is configured to fill a gap between the external conductor and the groove.

* * * * *